United States Patent
Zhao et al.

(10) Patent No.: US 12,532,100 B2
(45) Date of Patent: Jan. 20, 2026

(54) SOUND TRANSDUCER AND MEMS MICROPHONE

(71) Applicant: AAC Microtech (Changzhou) Co., Ltd., Jiangsu (CN)

(72) Inventors: Zhuanzhuan Zhao, Changzhou (CN); Bo Li, Changzhou (CN); Kaijie Wang, Changzhou (CN); Rui Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 170 days.

(21) Appl. No.: 18/624,103

(22) Filed: Apr. 1, 2024

(65) Prior Publication Data
US 2025/0193567 A1 Jun. 12, 2025

Related U.S. Application Data

(63) Continuation of application No. PCT/CN2023/137823, filed on Dec. 11, 2023.

(51) Int. Cl.
*H04R 19/04* (2006.01)
*H04R 1/08* (2006.01)

(52) U.S. Cl.
CPC ......... *H04R 1/08* (2013.01); *H04R 2201/003* (2013.01)

(58) Field of Classification Search
CPC .. H04R 7/06; H04R 2201/003; H04R 19/005; H04R 19/016; B81B 2201/0257
See application file for complete search history.

(56) References Cited

U.S. PATENT DOCUMENTS

| | | | | |
|---|---|---|---|---|
| 8,847,289 B2 * | 9/2014 | Wang | ............ | H04R 31/00 |
| | | | | 257/254 |
| 8,962,368 B2 * | 2/2015 | Wang | ............ | H04R 31/00 |
| | | | | 257/E21.573 |
| 9,462,389 B2 * | 10/2016 | Wang | ............ | H04R 7/16 |
| 9,540,226 B2 * | 1/2017 | Klein | ............ | B81B 3/007 |
| 10,129,651 B2 * | 11/2018 | Zhang | ............ | B81B 3/0051 |
| 10,343,898 B1 * | 7/2019 | Chen | ............ | H04R 7/08 |
| 11,350,218 B2 * | 5/2022 | Cerini | ............ | H10N 30/302 |
| 11,399,228 B2 * | 7/2022 | Liang | ............ | H04R 1/1075 |
| 11,496,820 B2 * | 11/2022 | Wu | ............ | H04R 19/04 |
| 11,902,740 B2 * | 2/2024 | Sun | ............ | H04R 1/406 |

(Continued)

FOREIGN PATENT DOCUMENTS

| | | | | |
|---|---|---|---|---|
| CN | 116996822 A | * | 11/2023 | ............ H04R 19/04 |
| WO | WO-2020062144 A1 | * | 4/2020 | ............ H04R 19/04 |

*Primary Examiner* — Ryan Robinson
(74) *Attorney, Agent, or Firm* — Wiersch Law Group

(57) ABSTRACT

The present disclosure discloses a sound transducer including a substrate; a back plate mounted on the substrate; a back plate electrode mounted on a side of back plate facing the substrate, including a plurality of first electrode plates arranged at intervals; a diaphragm electrode opposite to the back plate along a first direction, including: a plurality of second electrode plates arranged at intervals; and a center pillar arranged between the back plate and the diaphragm electrode, extending along the first direction; the plurality of first electrode plates surrounds the center pillar; the plurality of second electrode plates surrounds the center pillar; each second electrode plate is flexibly connected to the center pillar. The sound transducer in the present disclosure has sound localization function.

9 Claims, 6 Drawing Sheets

(56) References Cited

U.S. PATENT DOCUMENTS

| | | | |
|---|---|---|---|
| 11,943,584 B2* | 3/2024 | Chen | B81B 3/001 |
| 12,207,052 B2* | 1/2025 | Mao | B81B 7/0016 |
| 2016/0112802 A1* | 4/2016 | Yoo | H04R 19/04 |
| | | | 381/174 |
| 2022/0396469 A1* | 12/2022 | Chen | H04R 19/04 |
| 2023/0339742 A1* | 10/2023 | Chen | H04R 19/04 |
| 2025/0145449 A1* | 5/2025 | Fukutome | B81B 3/0051 |

\* cited by examiner

SOUND TRANSDUCER AND MEMS MICROPHONE

FIELD OF THE PRESENT DISCLOSURE

The present disclosure relates to microphone technologies, especially relates to a sound transducer, and a MEMS microphone.

DESCRIPTION OF RELATED ART

Traditional MEMS microphone generally includes a back plate and a diaphragm spaced at a certain distance from the back plate. The MEMS microphone detects acoustic signal by sensing the capacitance variation between the diaphragm and the back plate when the diaphragm vibrates driven by the sound wave, thus achieving the conversion from acoustic signals into electric signal. However, omnidirectional microphone is hard to detect pure sound signal from noise sound signals. Even though microphone array is directional, it is generally applied in professional sound domain with large-scale package having negative effect on sound quality.

Therefore, it is necessary to provide an improved sound transducer to overcome the problems mentioned above.

SUMMARY OF THE INVENTION

One object of the present disclosure is to provide a miniaturized sound transducer having sound localization function.

A sound transducer including: a substrate; a back plate mounted on the substrate; a back plate electrode mounted on a side of back plate facing the substrate, including a plurality of first electrode plates arranged at intervals; a diaphragm electrode opposite to the back plate along a first direction, comprising: a plurality of second electrode plates arranged at intervals; and a center pillar arranged between the back plate and the diaphragm electrode, extending along the first direction; the plurality of first electrode plates surrounds the center pillar; the plurality of second electrode plates surrounds the center pillar; each second electrode plate is flexibly connected to the center pillar; each first electrode plate is electrically conductive, one of two adjacent second electrode plates is electrically conductive; or, each second electrode plate is conductive, one of two adjacent first electrode plates is electrically conductive.

As an improvement, the center pillar is electrically isolated; one end of the center pillar is fixed to the back plate.

As an improvement, the center pillar is electrically conductive; the diaphragm electrode further includes a connecting member mounted on one end of the center pillar away from the back plate; two ends of the connecting member are separately connected to the center pillar and the substrate.

As an improvement, the diaphragm electrode further includes a fixing member mounted on one end of the second electrode plate away from the center pillar; two ends of the fixing member are separately connected to the second electrode plate and the substrate.

As an improvement, the fixing member includes a main portion along a direction surrounding the center pillar, a first fixation end bending from one end of the main portion and extending towards the center pillar, a second fixation end bending from the other end of the main portion and extending away from the center pillar; the first fixation end is fixed to the second electrode plate, the second fixation end is fixed to the substrate.

As an improvement, a distance between two ends of each second electrode plate and the same first electrode plate are different.

As an improvement, a projection the first electrode plate along the first direction is overlapped with two second electrode plates.

As an improvement, the plurality of first electrode plates is fixed to the back plate; the sound transducer further includes a plurality of sound holes penetrating the back plate and the first electrode plates along the first direction; the sound hole is arranged opposite to the second electrode plate along the first direction.

Another object of the present disclosure is to provide a MEMS microphone including having a receiving space and the sound transducer as described above received in the receiving space; the housing includes a first through hole and a second through hole both configured to connect the receiving space with outside; the substrate is mounted on the housing and configured to cover the first through hole.

BRIEF DESCRIPTION OF THE DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
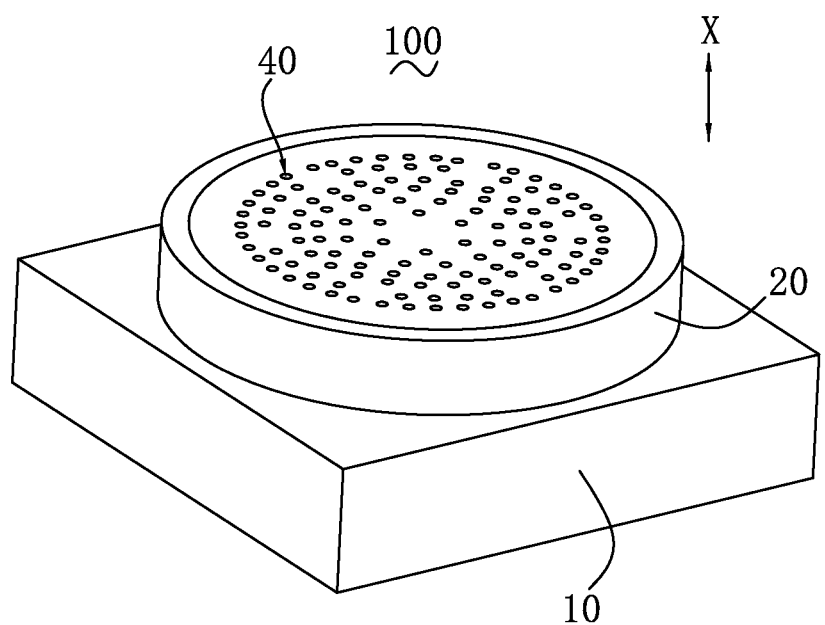
FIG. 1 is a schematic of a sound transducer in accordance with an exemplary embodiment of the present disclosure.
Figure 2:
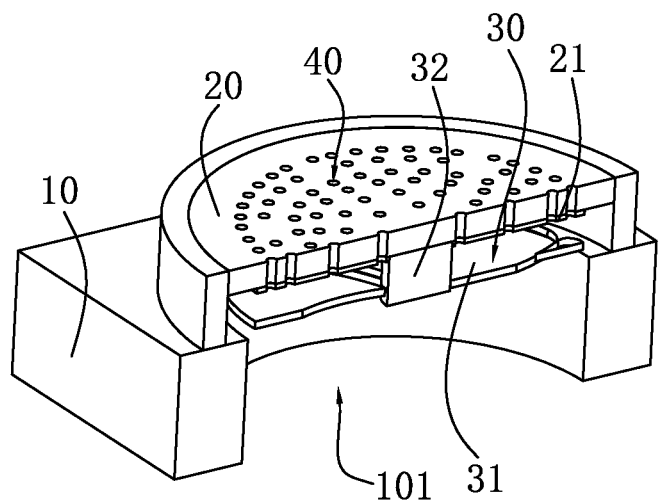
FIG. 2 is a cross-sectional view of the sound transducer in FIG. 1.
Figure 3:
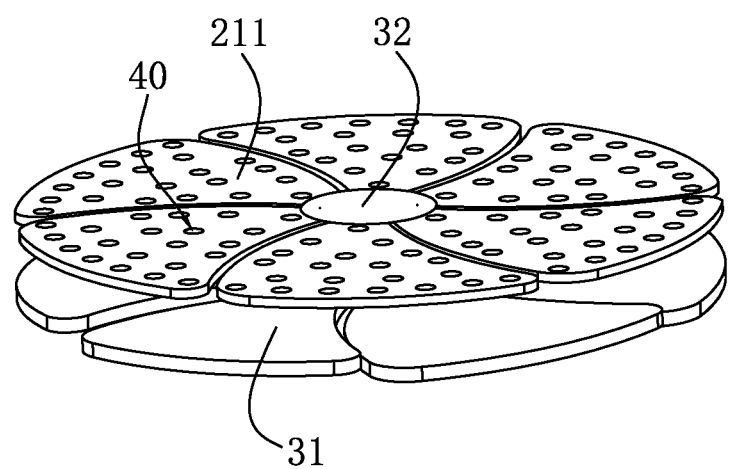
FIG. 3 is an isometric view of a first electrode plate and a second electrode plate of the sound transducer in FIG. 1.
Figure 4:
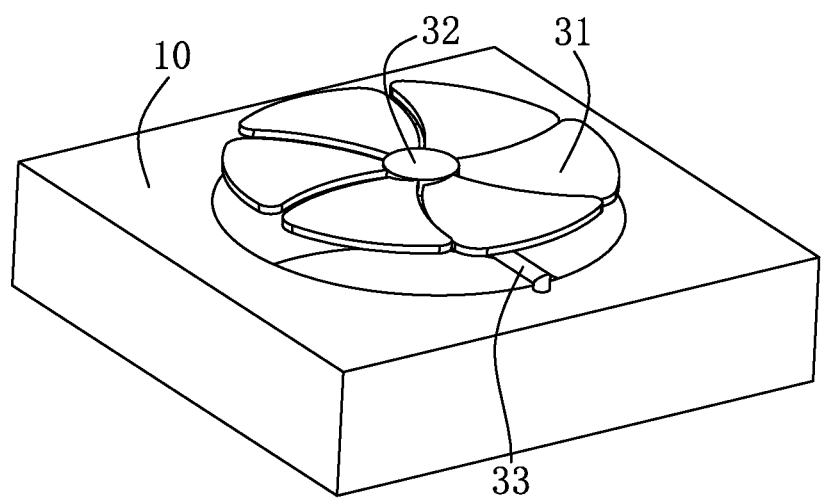
FIG. 4 is an isometric view of the assembly of a second electrode plate of a sound transducer in accordance with another exemplary embodiment of the present disclosure.
Figure 5:
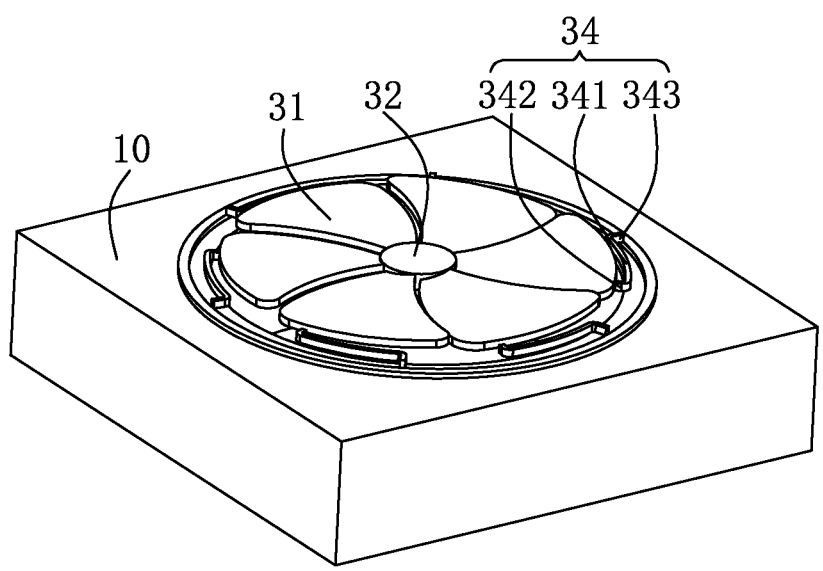
FIG. 5 is an isometric view of the assembly of a second electrode plate of a sound transducer in accordance with another exemplary embodiment of the present disclosure.
Figure 6:
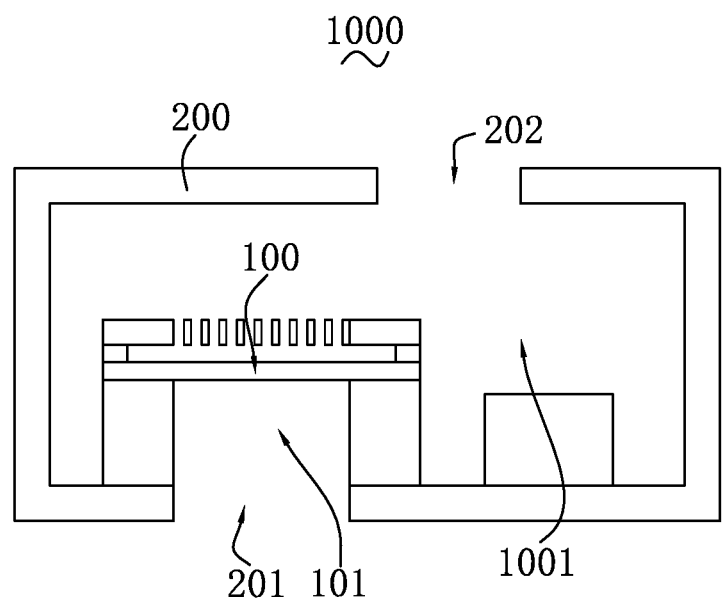
FIG. 6 an isometric view of a MEMS microphone in accordance with an exemplary embodiment of the present disclosure.

Please refer to FIGS. 1-5, a sound transducer 100 provided by an exemplary embodiment of the present disclosure includes a substrate 10, a back plate 20 mounted on the substrate 10, a diaphragm electrode 30 opposite to the back plate 20 along a first direction X, and a back plate electrode 21 mounted on a side of the back plate 20 facing the substrate 10 and the diaphragm electrode 30.

The back plate 20 is mounted on the substrate 10 in a manner of physical vapor deposition such as evaporation or sputtering, thus enhancing the connection strength between the substrate 10 and the back plate 20 and improving the structural consistency of the substrate 10 and the back plate 20.

In the present disclosure, a back cavity 101 is enclosed by the back plate 20 and the substrate 10 to receive the diaphragm electrode 30 and the back plate electrode 21.

The diaphragm electrode 30 is spaced apart from the back plate electrode 21 along the first direction X forming a capacitance system. The distance between the diaphragm electrode 30 and the back plate electrode 21 varies with the vibration of the diaphragm electrode 30 under external sound wave, thus resulting in the capacitance change of the capacitance system and then achieving signal conversion.

Specifically, the back plate electrode 21 includes a plurality of first electrode plates 211 arranged at intervals. The diaphragm electrode 30 includes a plurality of second electrode plates 31 arranged at intervals and a center pillar 32. The center pillar 32 arranged between the back plate 20 and the diaphragm electrode 30 extends along the first direction X. The plurality of first electrode plates 211 surrounds the center pillar 32. The plurality of second electrode plates 31 surrounds the center pillar 32; each second electrode plate 31 is flexibly connected to the center pillar 32.

Each first electrode plate 211 is electrically conductive, one of two adjacent second electrode plates 31 is electrically conductive; or, each second electrode plate 31 is conductive, one of two adjacent first electrode plates 211 is electrically conductive. It should be noted that the electrical conductivity of the first electrode plate 211 and the second electrode plate 31 may depends on whether they are doped.

In detail, the first electrode plate 211 is spaced away from the second electrode plate 31 along the first direction X. The capacitance variation is generated between the first electrode plate 211 and the second electrode plate 31. Owing to its flexible connection with the center pillar 32, the second electrode plate 31 may twist as a result of external sound wave. In one embodiment, the second electrode plate 31 could be flexible printed circuit board. When the external sound wave is transmitted to the second electrode plate 31, the second electrode plate 31 twists slightly around the center pillar 32.

Furthermore, a distance between two ends of each second electrode plate and the same first electrode plate along the first direction X are different. In one embodiment, the second electrode plate 31 is a curved non-planar structure. Or, in another embodiment, the second electrode plate 31 is a planar structure located in a plane non-parallel with the first electrode plate 211. As a result, the second electrode plate 31 is more prone to twist under the external sound wave, thus resulting in higher sensitivity. Simultaneously, the sound transducer could determine the sound direction of the input sound wave. Additionally, the electrical signal may be output via the second electrode plate 31 and the first electrode plate 211 optionally.

In one embodiment, the center pillar 32 is electrically isolated; one end of the center pillar 32 is fixed to the back plate 20. Furthermore, the plurality of first electrode plates 211 is provided electrically conductive, one of two adjacent second electrode plates 31 is electrically conductive, thus achieving sound localization function of the sound transducer 100.

In one embodiment, the center pillar 32 is electrically conductive; the diaphragm electrode 30 further includes a connecting member 33 mounted on one end of the center pillar 32 away from the back plate 20; two ends of the connecting member 33 are separately connected to the center pillar 32 and the substrate 10. Furthermore, the plurality of second electrode plates 31 is provided electrically conductive, one of two adjacent first electrode plates 211 is electrically conductive, thus achieving sound localization function of the sound transducer 100.

In one embodiment, the diaphragm electrode 30 further includes a fixing member 34 mounted on one end of the second electrode plate 31 away from the center pillar 32; two ends of the fixing member 34 are separately connected to the second electrode plate 31 and the substrate 10. Moreover, the size of the fixing member 34 along the first direction X could be adjusted to meet different design needs.

Additionally, the fixing member 34 includes a main portion 341 along a direction surrounding the center pillar 32, a first fixation end 342 bending from one end of the main portion 341 and extending towards the center pillar 32, a second fixation end 343 bending from the other end of the main portion 341 and extending away from the center pillar 32; the first fixation end 342 is fixed to the second electrode plate 31, the second fixation end 343 is fixed to the substrate 10. More clearly, the main portion 341 is an arc shape segment surrounding the center pillar 32, forming a Z shape structure with the first fixation end 342 and the second fixation end 343. Thus, the contact area between the fixing member 34 and the second electrode plate 31 could be reduced to reducing the restriction of the fixing member 34 to the torsion of the second electrode plate 31, further improving the sensitivity of the sound transducer 100.

The plurality of first electrode plates 211 is fixed to the back plate 20; the sound transducer 100 further includes a plurality of sound holes 40 penetrating the back plate 20 and the first electrode plates 211 along the first direction X; the sound hole 40 is arranged opposite to the second electrode plate 31 along the first direction X. Specifically, the sound holes 40 penetrates the back plate 20 and the first electrode plate 211.

Optionally, a projection the first electrode plate 211 along the first direction X is overlapped with two second electrode plates 31. In another word, the first electrode plate 211 is malposed with the second electrode plate 31 along the first direction X. As a result, the sound wave may act more on the edge of the second electrode plate 31 making the torsion of the second electrode plate 31 easier, thereby improving the sensitivity of sound transducer 100.

The present disclosure further provides a MEMS microphone 1000. The MEMS microphone 1000 includes a housing 200 having a receiving space 1001 and the sound transducer 100 as described above received in the receiving space 1001. The housing 200 includes a first through hole 201 and a second through hole 202 both configured to connect the receiving space 1001 with outside. The substrate 10 is mounted on the housing 200 and configured to cover the first through hole 201. The first through hole 201 is connected with the back cavity 101.

Compared with the related art, the sound transducer of the present disclosure includes a back plate electrode having a plurality of first electrode plates arranged at intervals, and a diaphragm electrode having a plurality of second electrode plates arranged at intervals and a center pillar extending along a first direction. The plurality of first electrode plates surrounds the center pillar; the plurality of second electrode plates surrounds the center pillar; each second electrode plate is flexibly connected to the center pillar. Each first electrode plate is electrically conductive, one of two adjacent second electrode plates is electrically conductive; or, each second electrode plate is conductive, one of two adjacent first electrode plates is electrically conductive. A capacitance system is formed by the first electrode plate and the second electrode plate. When the sound wave from various directions enter the sound transducer, the second electrode plates twist accordingly to change capacitance of the capacitance system, thus determining the sound direction and achieving sound localization function of the sound transducer.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound transducer comprising:
   a substrate;
   a back plate mounted on the substrate;
   a back plate electrode mounted on a side of back plate facing the substrate, comprising a plurality of first electrode plates arranged at intervals;
   a diaphragm electrode opposite to the back plate along a first direction, comprising:
      a plurality of second electrode plates arranged at intervals; and
      a center pillar arranged between the back plate and the diaphragm electrode, extending along the first direction; wherein
   the plurality of first electrode plates surrounds the center pillar; the plurality of second electrode plates surrounds the center pillar; each second electrode plate is flexibly connected to the center pillar;
   each first electrode plate is electrically conductive, one of two adjacent second electrode plates is electrically conductive; or,
   each second electrode plate is conductive, one of two adjacent first electrode plates is electrically conductive.

2. The sound transducer as described in claim 1, wherein the center pillar is electrically isolated; one end of the center pillar is fixed to the back plate.

3. The sound transducer as described in claim 1, wherein the center pillar is electrically conductive; the diaphragm electrode further comprises a connecting member mounted on one end of the center pillar away from the back plate; two ends of the connecting member are separately connected to the center pillar and the substrate.

4. The sound transducer as described in claim 1, wherein the diaphragm electrode further comprises a fixing member mounted on one end of the second electrode plate away from the center pillar; two ends of the fixing member are separately connected to the second electrode plate and the substrate.

5. The sound transducer as described in claim 4, wherein the fixing member comprises a main portion along a direction surrounding the center pillar, a first fixation end bending from one end of the main portion and extending towards the center pillar, a second fixation end bending from the other end of the main portion and extending away from the center pillar; the first fixation end is fixed to the second electrode plate, the second fixation end is fixed to the substrate.

6. The sound transducer as described in claim 1, wherein a distance between two ends of each second electrode plate and the same first electrode plate are different.

7. The sound transducer as described in claim 1, wherein a projection the first electrode plate along the first direction is overlapped with two second electrode plates.

8. The sound transducer as described in claim 1, wherein the plurality of first electrode plates is fixed to the back plate; the sound transducer further comprises a plurality of sound holes penetrating the back plate and the first electrode plates along the first direction; the sound hole is arranged opposite to the second electrode plate along the first direction.

9. A MEMS microphone comprising a housing having a receiving space and the sound transducer as described in claim 1 received in the receiving space, wherein the housing comprises a first through hole and a second through hole both configured to connect the receiving space with outside; the substrate is mounted on the housing and configured to cover the first through hole.

* * * * *